United States Patent [19]

Inoue

[11] Patent Number: 5,508,848
[45] Date of Patent: Apr. 16, 1996

[54] WIDE-ANGLE LENS FOR FILM-COMBINED TYPE CAMERAS

[75] Inventor: Toshiyuki Inoue, Yamanashi, Japan

[73] Assignee: Yamanashi Factory of Nissin Kohki, Mfg. Co., Ltd., Yamanashi, Japan

[21] Appl. No.: 33,419

[22] Filed: Mar. 18, 1993

Related U.S. Application Data

[63] Continuation of Ser. No. 616,847, Nov. 21, 1990, abandoned.

[30] Foreign Application Priority Data

Nov. 22, 1989 [JP] Japan .................................. 1-304334

[51] Int. Cl.$^6$ .................................................. G02B 13/18
[52] U.S. Cl. ............................ 359/717; 359/739; 359/793
[58] Field of Search ............................. 359/793, 642, 359/643, 646, 648, 664, 708, 691, 670, 713, 714, 715, 716, 717, 661, 692, 739, 748, 753, 795, 744

[56] References Cited

U.S. PATENT DOCUMENTS

| | | | |
|---|---|---|---|
| 2,730,925 | 1/1956 | Kavangh | 359/646 |
| 2,889,745 | 6/1959 | Hayes et al. | 359/793 |
| 4,789,230 | 12/1988 | Ohta | 359/793 |
| 4,865,435 | 9/1989 | Cho | 359/716 |
| 4,953,926 | 9/1990 | Morimoto | 359/793 |

FOREIGN PATENT DOCUMENTS

| | | | |
|---|---|---|---|
| 58-149017 | 9/1983 | Japan | 359/716 |
| 0091618 | 5/1986 | Japan | 359/717 |
| 62-78520 | 4/1987 | Japan | 359/714 |
| 6353512 | 3/1988 | Japan | 359/717 |
| 271219 | 3/1990 | Japan | 359/793 |

Primary Examiner—James Phan
Attorney, Agent, or Firm—McAulay Fisher Nissen Goldberg & Kiel

[57] ABSTRACT

The present invention provides a wide-angle lens for film-combined type cameras, comprising a first lens element having a negative refractive power and a second lens element having a positive refractive power which have more than one aspherical surface.

5 Claims, 4 Drawing Sheets

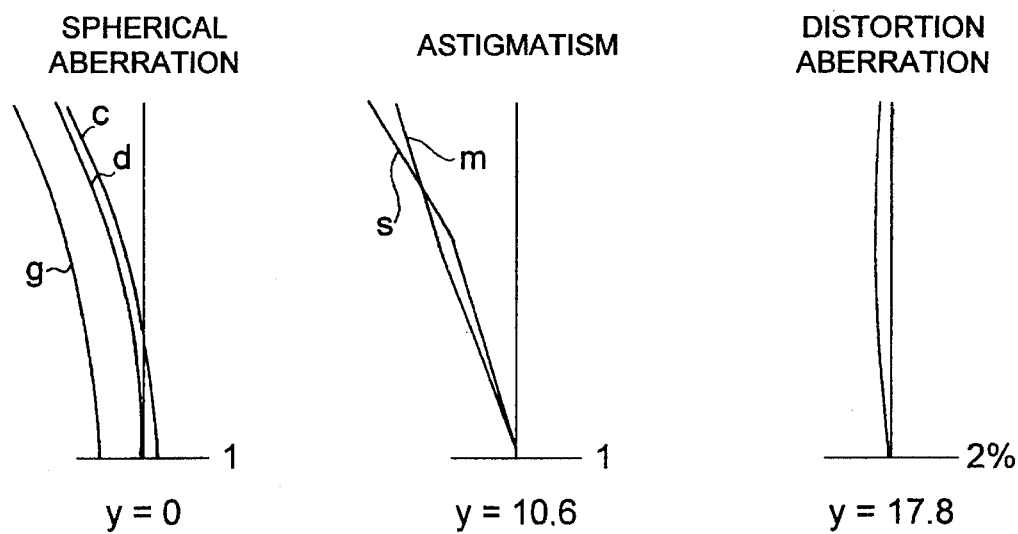
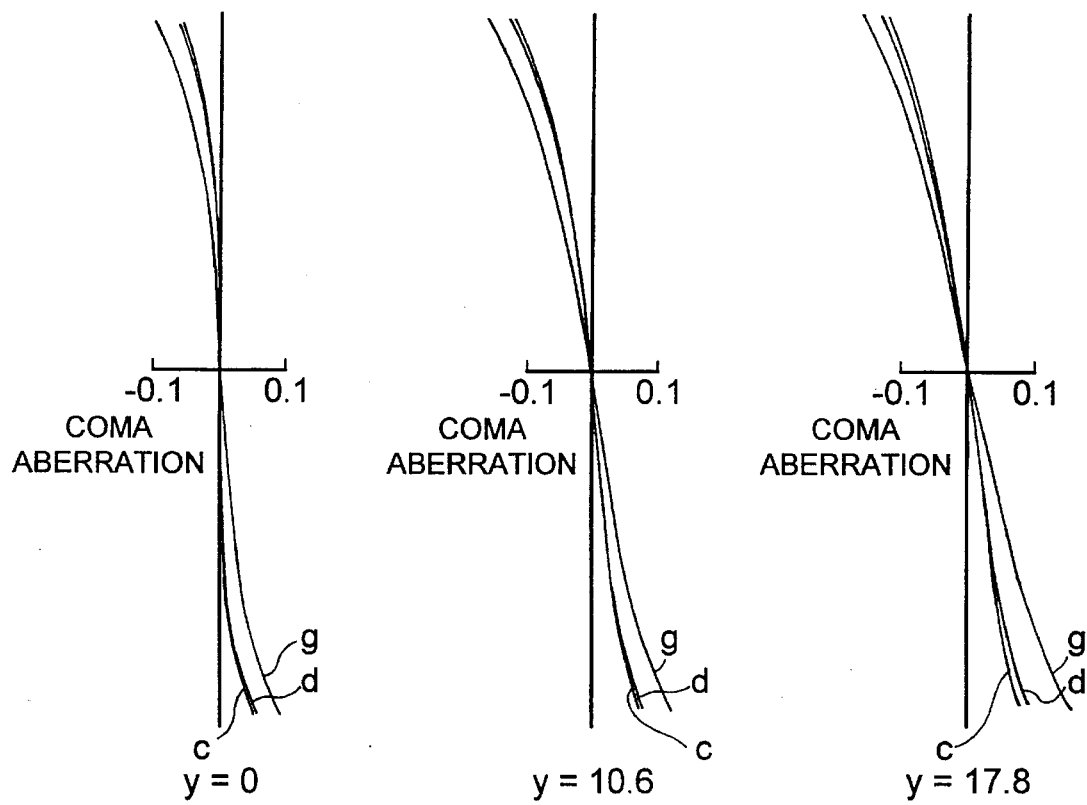

| SPHERICAL ABERRATION | ASTIGMATISM | DISTORTION ABERRATION |
|---|---|---|
| 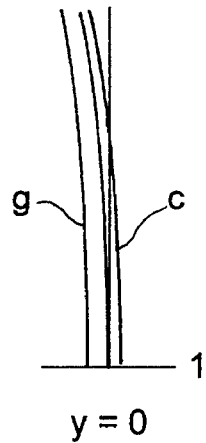 | 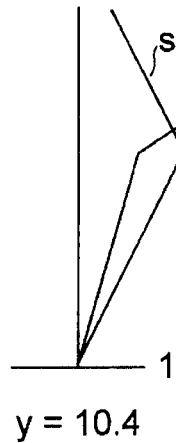 | 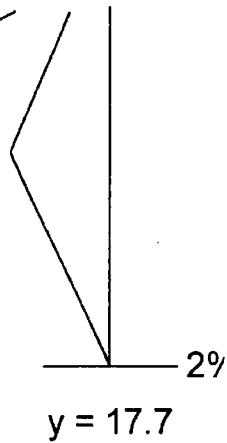 |
| y = 0 | y = 10.4 | y = 17.7 |
| FIG. 3A | FIG. 3B | FIG. 3C |
| SPHERICAL ABERRATION / COMA ABERRATION | ASTIGMATISM / COMA ABERRATION | DISTORTION ABERRATION / COMA ABERRATION |
|---|---|---|
| 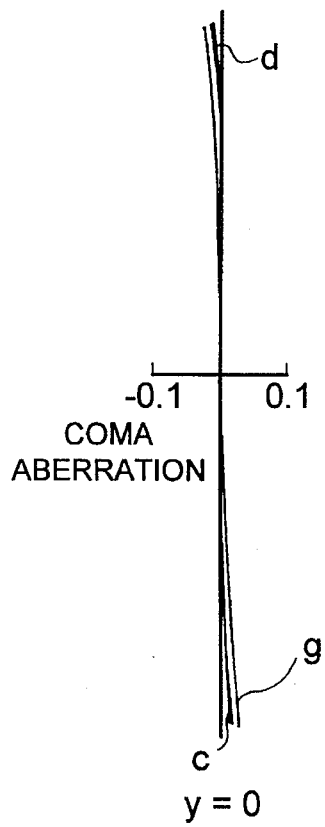 | 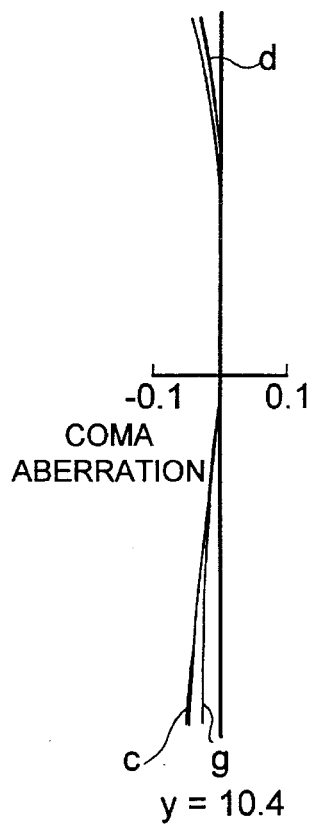 | 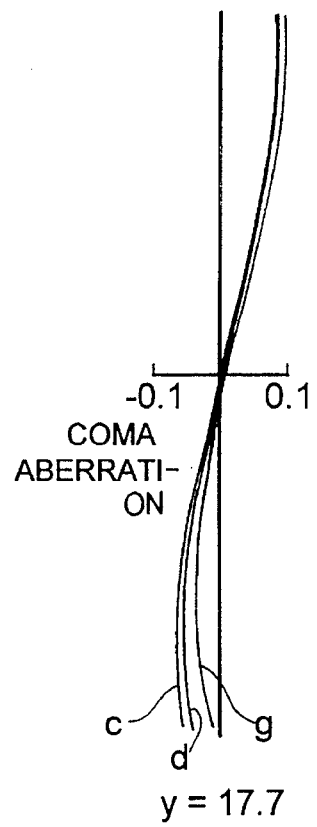 |
| y = 0 | y = 10.4 | y = 17.7 |
| FIG. 3D | FIG. 3E | FIG. 3F |

SPHERICAL ABERRATION y = 0

ASTIGMATISM y = 10.3

DISTORTION ABERRATION y = 17.2

COMA ABERRATION y = 0

COMA ABERRATION y = 10.3

COMA ABERRATION y = 17.2

WIDE-ANGLE LENS FOR FILM-COMBINED TYPE CAMERAS

This application is a continuation, of application Ser. No. 07/616,847, filed Nov. 21, 1990, now abandoned.

FIELD OF THE INVENTION

The present invention relates to a wide-angle lens for film-combined type cameras.

BACKGROUND PRIOR ART

Film-combined type cameras have been recently introduced which are constructed by equipping film packages with a convex lens.

When a wide-angle lens is provided, the focal distance of such conventional film-combined type cameras is limited to about 30 mm because of the increase of magnification-chromatic aberration.

The present invention is directed toward solving such stated problems. It is an object of the present invention to provide a novel wide-angle lens for film-combined type cameras which ensures further widening of their shot angle.

SUMMARY OF THE INVENTION

A wide-angle lens for film-combined type cameras according to the invention comprises a first lens element having a negative refractive power and a second lens element having a positive refractive power which lenses have more than one aspherical plane to ensure further widening of their shot angle.

For a better understanding of the present invention, reference is made to the following description and accompanying drawings while the scope of the invention will be pointed out in the appended claims.

BRIEF DESCRIPTION OF THE DRAWINGS

FIGS. 2 to 4 show the aberrations of the lenses according to embodiments-1 to 3 of the invention.

DETAILED DESCRIPTION OF THE INVENTION AND PREFERRED EMBODIMENTS

Because of such construction as described above, the inventive lens attains focal lengths as small as 17 to 18 mm and, nevertheless, permits a long back focus.

For carrying out the invention, it is preferable to satisfy the following requirement:

$$-3 < f_1/f_2 < -1 \quad (1)$$

wherein $f_1$ denotes the focal length of the first lens element and $f_2$ that of the second lens element.

This relationship is necessary for reducing bending of image planes. It becomes positive or negative when its upper or lower limit, respectively, is exceeded. For keeping it within a proper range, therefore, it is preferable to satisfy the requirement.

With the construction according to the invention, the two lens elements attain sufficient performance, ensuring achromatism, even when made from the same material. When made from acryl, they are very suitable for film-combined type cameras with associated manufacturing cost reduction.

In order to obtain good achromatism, the distance (d) between the first and second lens elements as well as focal lengths $f_1$, $f_2$ should preferably satisfy requirement:

$$-1.5 < f_1/f_2 + \{f_1/(f_1-d)\}^2 < -0.5 \quad (2)$$

The reason for this is because the chromatic aberration of the F-line becomes negative or exhibits a negatively large value when the upper or lower limit of the formula (2) is exceeded.

For good correction of astigmatism or distortion aberration, a concave meniscus lens is used as a first lens element and the refractive index (n) of the first lens element and the curvature radius ($r_2$) of the second plane as well as focal length $f_1$ satisfy the requirement:

$$-1 < r_2/\{(n-1)f_1\} < -0.5 \quad (3)$$

Astigmatism exhibits positively large values when the upper limit of the requirement is exceeded or astigmatism and bending aberration exhibit negatively large values when its lower limit is exceeded. For good correction of aberrations, therefore, it is preferable that the distance (d) between the first and second lens elements and focal length $f_1$ should preferably satisfy requirement:

$$-0.5 < d/f_1 < 0 \quad (4)$$

Short back focus is obtained or the first lens element becomes excessively large when the upper limit or lower limit of the requirement is exceeded.

Figure 1:
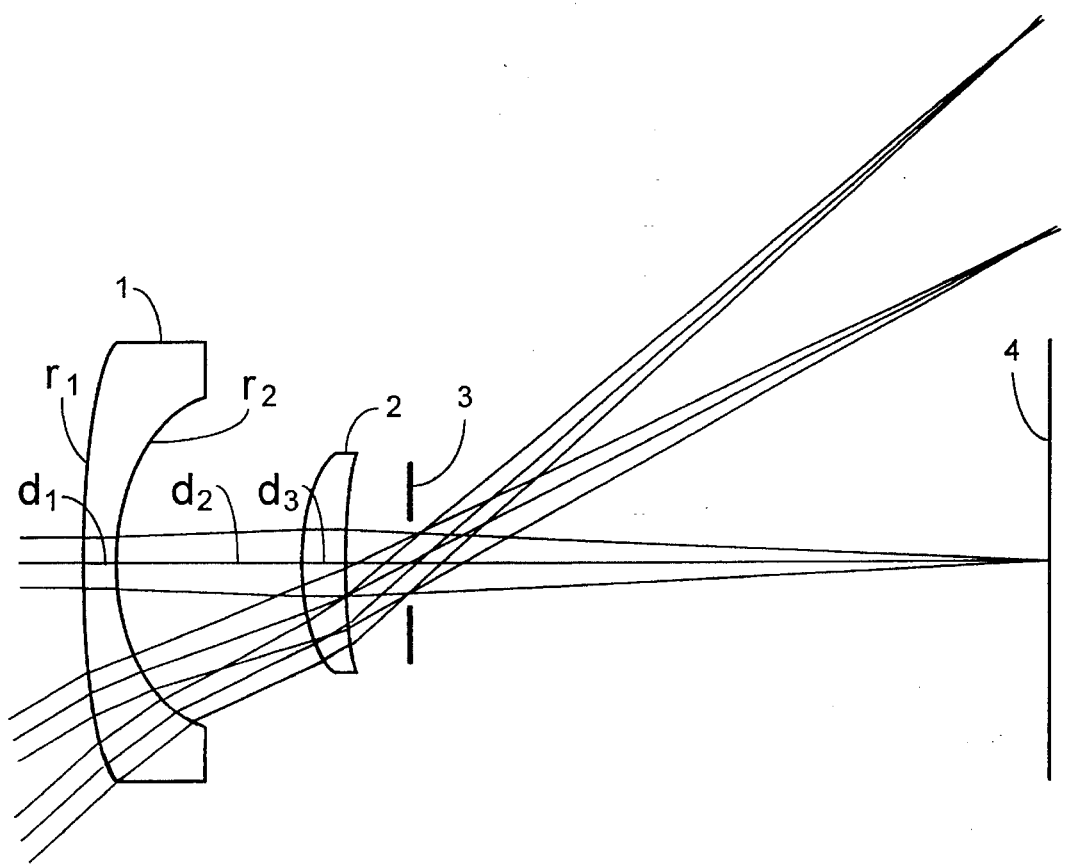
FIG. 1 shows the element construction of the lenses according to the embodiments of the invention for film-combined type cameras.
Figure 4A:
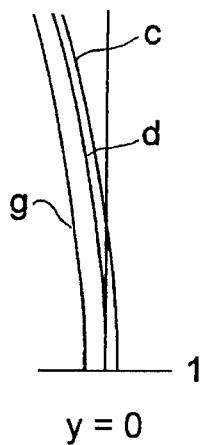
Figure 4B:
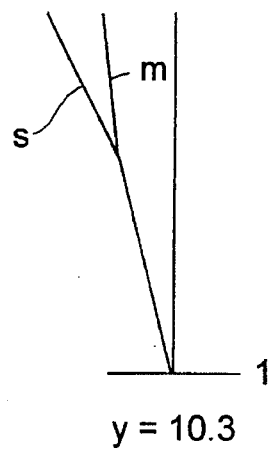
Figure 4C:
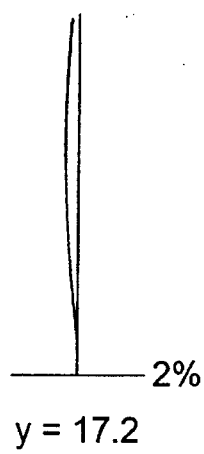
Figure 4D:
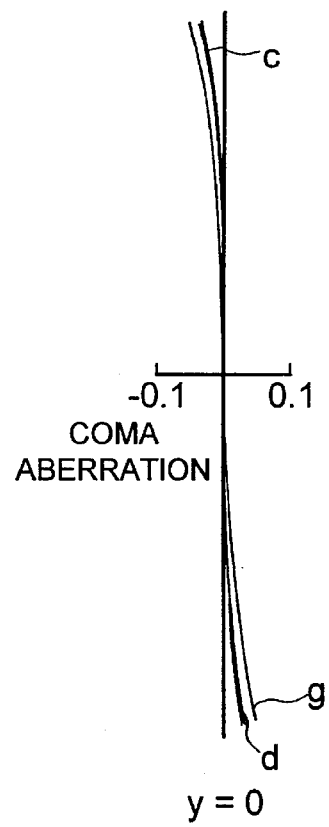
Figure 4E:
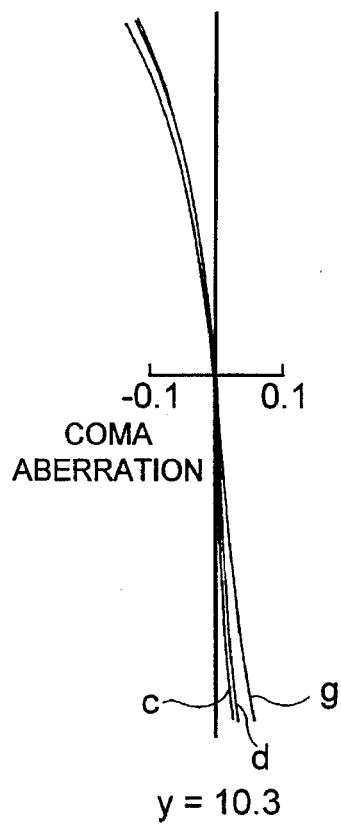
Figure 4F:
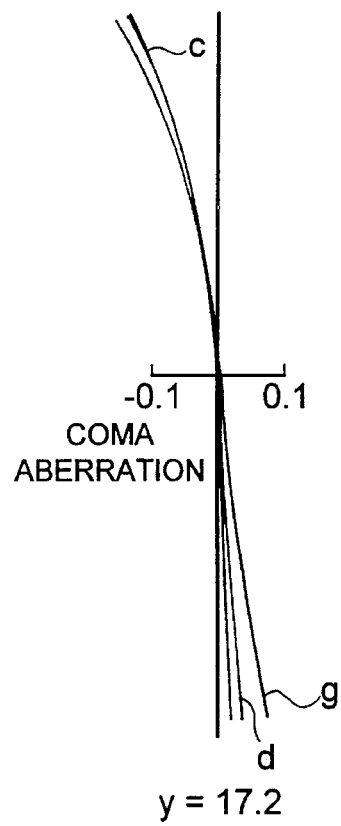

FIG. 1 shows a construction of the lens according to the third embodiment of the invention that will be described below. A shot object is understood to be at the left of the figure.

In the figure, numeral 1 denotes a first lens element, 2 a second lens element, 3 a diaphragm, and 4 a film surface.

The curvature radius of the surface of the (i)-th lens element counted from the object side is presented by $r_i$ (i=1 to 4) as illustrated and the distance between the surfaces of the (i)-th lens elements by $d_i$ (i=1 to 3). Symbol (d) of the formula (2) and (4) is the same as ($d_2$). Symbol ($d_4$) denotes the distance between the fourth surface and the side face of the object on the diaphragm as illustrated.

The refractive factor of the material of the (j)-th lens element counted from the object side is represented by $r_j$ (j=1 to 2). Therefore symbol (n) of the formula (3) is the same as ($n_1$).

Non-spherical surfaces are represented by using a known non-spherical surface equation:

$$X = [CY^2/\{1 + \sqrt{1-(K+1)C^2Y^2}\}] + A_4Y^4 + A_6Y^6 + A_8Y^8 + A_{10}Y^{10} + \ldots \quad (p6)$$

wherein symbol X denotes its optical axis coordinate, Y the coordinate orthogonal therewith, C is the curvature radius of the optical axis, K is the conical constant and high-order non-spherical factor $A_m$ (m=4,6,8,10 ...). Adopted non-spherical surfaces are specified by providing a conical constant and a high-order non-spherical factor. For those connected with non-spherical surface of above curvature radii ($r_1$–$r_4$), curvature radius $r_i$ gives that C on the optical axis.

Embodiment 1:

| $F_{NO} = 11$, combined focal distance F = 18 mm | | | | |
|---|---|---|---|---|
| i | $r_i$ | $d_i$ | j | $n_j$ |
| 1 | 22.2 | 1.0 | 1 | 1.492 |
| 2 | 5.9 | 6.0 | | |
| 3 | 4.6 | 2.0 | 2 | 1.492 |
| 4 | 21.7 | 2.0 | | |

Both the first and second elements of the lens according to Embodiment-1 are made from acryl. Its fourth surface is non-spherical.

Non-spherical surface (4th):
$k=8.36\times10^{-1}, A_4=-2.00\times10^{-4}, A_6=5.81\times10^{-8}$
$f_1=-16.670, f_2=11.424, f_1/f_2=-1.459,$
$r_2/\{(n-1f_1\}=-0.719, d/f_1=-0.360$
$f_1f_2+\{f_1/(f_1-d)\}^2=-0.918$ Embodiment-2:

| $F_{NO} = 11$, combined focal distance F = 18 mm | | | | |
|---|---|---|---|---|
| i | $r_i$ | $d_i$ | j | $n_j$ |
| 1 | 16.0 | 1.0 | 1 | 1.5168 |
| 2 | 6.0 | 5.0 | | |
| 3 | 4.5 | 2.8 | 2 | 1.5168 |
| 4 | 16.0 | 1.3 | | |

Both the first and second elements of the lens according to Embodiment-2 are made from BK7. Its first and second surface are non-spherical.

Non-spherical surface (1st):
$k=1.53, A_4=6.21\times10^{-5}, A_6=-2.60\times10^{-6}$
$A_8=-1.98\times10^{-8}, A_{10}=3.58\times10^{-10}$
Non-spherical surface (2nd)
$k=9.66\times10^{-2}, A_4=1.52\times10^{-3}, A_6=-1.35\times10^{-4}$
$A_8=5.42\times10^{-6}, A_{10}=-1.03\times10^{-7}$
$f_1=-20.178, f_2=11.780, f_1/f_2=-1.713,$
$r_2/\{(n-1)f_1\}=-0.604, d/f_1=-0.248$
$f_1/f_2+\{f_1/(f_1-d)\}^2=-1.068$ Embodiment-3:

| $F_{NO} = 11$, combined focal distance F = 17 mm | | | | |
|---|---|---|---|---|
| i | $r_i$ | $d_i$ | j | $n_j$ |
| 1 | 22.27 | 1.0 | 1 | 1.6.1117 |
| 2 | 7.02 | 5.0 | | |
| 3 | 5.06 | 2.5 | 2 | 1.62299 |
| 4 | 17.07 | 1.5 | | |

Both the first and second elements of the lens according to Embodiment-2 are made from SK8 and SK15 respectively. Its first, second and third surfaces are non-spherical.

Non-spherical surface (1st):
$k=8.85\times10^{-1}, A_4=-4.50\times10^{-5}, A_6=3.01\times10^{-8}$
Non-spherical surface (2nd):
$k=1.75\times10^{-1}, A_4=3.91\times10^{-5}, A_6=-2.98\times10^{-8}$
Non-spherical surface (3rd):
$k=9.14\times10^{-2}, A_4=2.51\times10^{-5}, A_6=-3.00\times10^{-8}$
$f_1=-17.201, f_2=10.690, f_1/f_2=-1.609,$
$r_2/\{(n-1)f_1\}=-0.668, d/f_1=-0.291$
$f_1f_2+\{f_1/(f_1-d)\}^2=-1.009$ FIGS. 2, 3 and 4 show the aberrations of the lenses according to Embodiments-1, 2 and 3 respectively.

In the drawings of spherical and coma aberrations, symbols (g), C and (d) denote those of (g)-, C- and (d)-lines respectively. In the drawing of astigmatisms, symbols (s) and (m) denote sagittal and meridional ones respectively.

Being so constructed as described heretofore, the lens according to the invention ensures widening of the shot angle. Further, the lens is capable of good correction of aberrations, in particular, by removing chromatic aberration when satisfying requirements (1) to (4). It also increases the amount of peripheral light, ensuring long back focus, and facilitates location of a camera mechanism because the diaphragm can be located at distances of 1 to 3 mm behind the second lens element.

While the foregoing description and drawings represent the preferred embodiments of the present invention, it will be obvious to those skilled in the art that various changes and modifications may be made therein without departing from the true spirit and scope of the present invention.

What is claimed is:

1. A wide-angle objective lens system for film-combined type cameras, comprising:

a first lens element arranged on the objective side of the lens system having a negative refractive power and a second lens element arranged on the focal plane side of the first lens element having a positive refractive power, said lens elements having more than one aspherical surface, said lens system having no more than two lens elements, wherein the following relationship is satisfied:

$-3 < f_1/f_2 < -1$ where $f_1$ represents the focal length of the first lens element and $f_2$ represents the focal length of the second lens element.

2. A wide-angle objective lens system for film-combined type cameras, comprising:

a first lens element arranged on the objective side of the lens system having a negative refractive power and a second lens element arranged on the focal plane side of the first lens element having a positive refractive power, said lens elements having more than one aspherical surface wherein the following relationship is satisfied:

$-1.5 < f_1/f_2 + \{f_1/(f_1-d)\}^2 < -0.5$ where $f_1$ represents the focal length of the first lens element, $f_2$ represents the focal length of the second lens element and d represents the distance between the first and second lens elements, said lens system having no more than two lens elements.

3. A wide-angle objective lens system for film-combined type cameras, comprising:

a first lens element arranged on the objective side of the lens system having a negative refractive power over its entire surface and a second lens element arranged on the focal plane side of the first lens element having a positive refractive power, said lens elements having more than one aspherical surface, each aspherical surface being symmetric about its optical axis, said lens system having no more than two lens elements; and wherein the first lens element is a meniscus lens having a concave surface facing the second lens element.

4. The wide-angle objective lens system of claim 3 wherein the following relationship is satisfied:

$-1 < r_2/\{(n-1)f_1\} < -0.5$ where n represents the refractive index of the first lens element, where $r_2$ represents the curvature radius of a second surface and $f_1$ represents the focal length of the first lens element.

5. A wide-angle objective lens system for film-combined type cameras, comprising:

a first lens element arranged on the objective side of the lens system having a negative refractive power over its entire surface and a second lens element arranged on the focal plane side of the first lens element having a positive refractive power, said lens elements having more than one aspherical surface, each aspherical surface being symmetric about its optical axis, and including a diaphragm located behind the second lens element, said lens system having no more than two lens elements; and wherein the distance between the diaphragm and the second lens element is 1 to 3 mm.

\* \* \* \* \*